US005457739A

United States Patent [19]

Le Cheviller

[11] Patent Number: 5,457,739

[45] Date of Patent: Oct. 10, 1995

[54] METHOD AND SYSTEM OF INTERACTIVE ACCESS TO RADIO BROADCAST INFORMATION ELEMENTS

[75] Inventor: Jean-Pierre Le Cheviller, Paris, France

[73] Assignee: France Telecom, Paris, France

[21] Appl. No.: 196,089

[22] PCT Filed: Jun. 17, 1993

[86] PCT No.: PCT/FR93/00601

§ 371 Date: Feb. 17, 1994

§ 102(e) Date: Feb. 17, 1994

[87] PCT Pub. No.: WO94/00933

PCT Pub. Date: Jan. 6, 1994

[30] Foreign Application Priority Data

Jun. 19, 1992 [FR] France .................................. 92 07483

[51] Int. Cl.$^6$ .................................................. H04M 11/00

[52] U.S. Cl. ........................... 379/93; 379/101; 379/102; 379/105; 455/6.3

[58] Field of Search .................................... 379/101, 102, 379/104, 105, 97, 98, 93, 94, 96, 88, 89, 90; 348/6, 7, 8, 12; 455/4.1, 4.2, 5.1, 6.1, 6.3, 3.1, 3.2

[56] References Cited

U.S. PATENT DOCUMENTS

| | | | |
|---|---|---|---|
| 4,789,863 | 12/1988 | Bush | 379/101 |
| 4,812,843 | 3/1989 | Champion, III et al. | 379/96 |
| 4,899,369 | 2/1990 | Kondziela | 379/101 |
| 4,942,616 | 7/1990 | Linstroth et al. | 379/97 |
| 5,132,992 | 7/1992 | Yurt et al. | 348/7 |

FOREIGN PATENT DOCUMENTS

| | | |
|---|---|---|
| 0082077 | 6/1983 | European Pat. Off. . |
| 0140593 | 5/1985 | European Pat. Off. . |
| 4029583 | 11/1901 | Germany . |
| 2178275 | 2/1987 | United Kingdom . |
| 2193420 | 2/1988 | United Kingdom . |
| 2209082 | 4/1989 | United Kingdom . |

*Primary Examiner*—Wing F. Chan
*Assistant Examiner*—Stella L. Woo
*Attorney, Agent, or Firm*—Nilles & Nilles

[57] ABSTRACT

A method and a system of interactive access on the telephone to information elements that have already been broadcast or are being broadcast from a set of sources. For this purpose, the system has a center for the digital recording and management of radio broadcast information elements, accessible through the switched telephone network by keying in a telephone number and the time at which the information to be listened to has been broadcast.

17 Claims, 2 Drawing Sheets

METHOD AND SYSTEM OF INTERACTIVE ACCESS TO RADIO BROADCAST INFORMATION ELEMENTS

Figure 1:
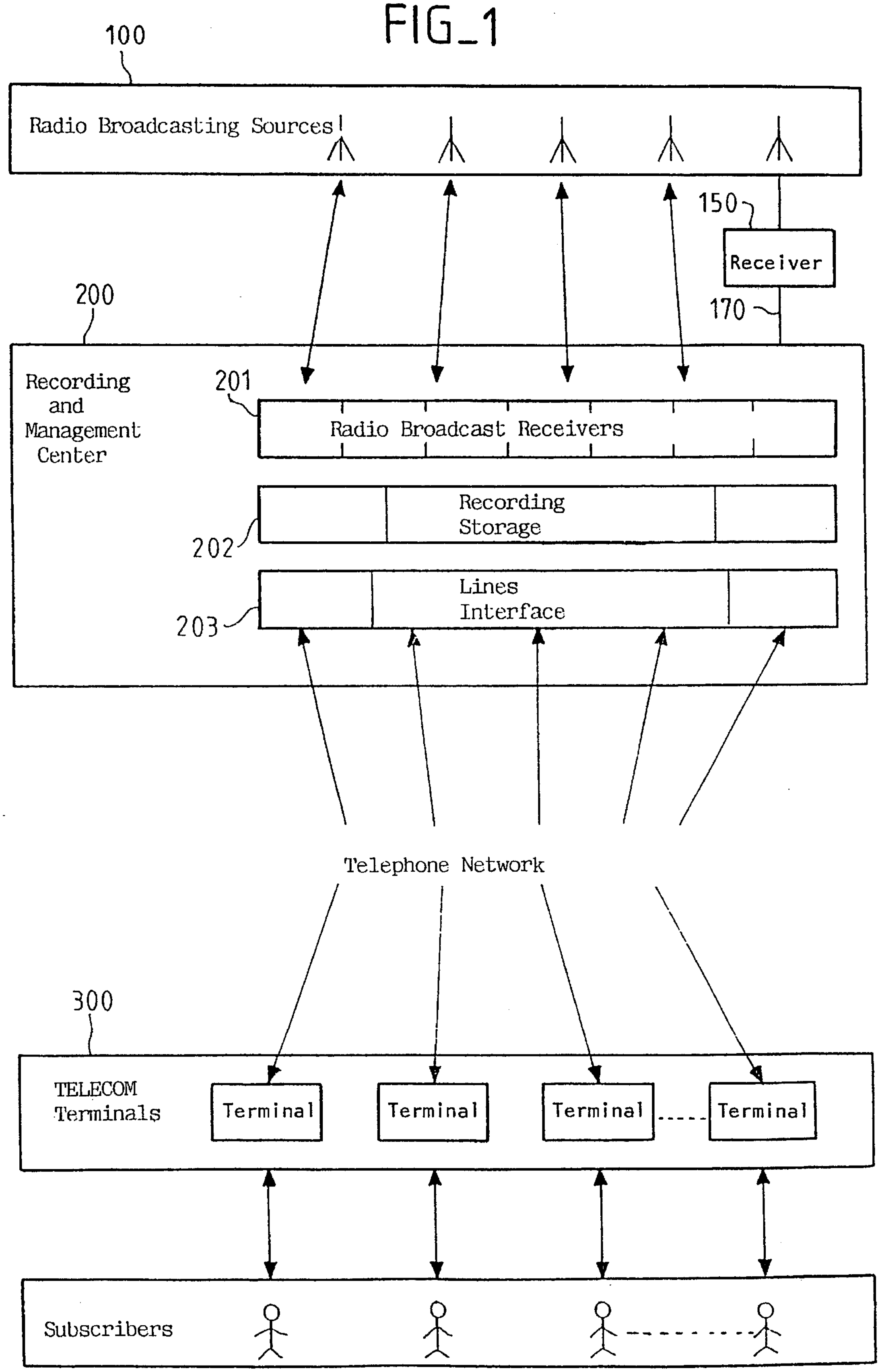

The invention relates to a method and a system of deferred access to information elements broadcast from a set of radio broadcasting sources.

The problem that the present Applicant has sought to resolve has never been raised hitherto: this is the problem of providing subscribers with deferred access information elements broadcast by radio transmission sources, whether these subscribers are in the zone of RF coverage or outside it, the access being obtained by means of the telephone network with the subscribers staying hooked up to the network and having interactive access.

Indeed, there are no means, to date, of enabling deferred access to information elements broadcast by one or more radio broadcasting stations at any time whatsoever after these information elements have been broadcast or just a few instants thereafter. It is this problem that the Applicant has tried to resolve and that the Applicant has resolved by the method that shall be described in detail hereinafter and by the device for the implementation of the method.

According to the invention, subscribers wishing to listen to an item of information that is broadcast by a broadcasting source can do so without possessing any special equipment other than a telephone or an equivalent device, in remaining hooked up to the network and and selecting any time of their choice.

An object of the present invention more particularly is, first of all, a method of deferred access to radio information elements broadcast by one or more radio broadcasting sources chiefly characterized in that it comprises the following steps:

A) receiving and digitizing the information elements broadcast by the sources and cyclically recording the information elements continuously with temporal reference markers corresponding to broadcasting time slots;

managing the recording and the reading of the information elements from a central processing unit so as to determine the time slot of the recording in which any broadcast information element is located;

B) gaining access to any recorded information element by the entering or keying in, from a telecommunications terminal, of a telephone number assigned to the central processing unit, by giving the source and time of the broadcast or a corresponding code of the information to be retrieved by means of the available terminal, and receiving this information element instantaneously on the telephone during the call itself.

An object of present information is also a system of deferred access to radio information elements broadcast by one or more broadcasting sources, chiefly characterized in that it comprises:

A) A center for the reception of broadcast information elements, for recording and for management of access in read/write mode, that is accessible by the switched telephone network, comprising:

a set of radio broadcast receivers, each being tuned to distinct broadcasting frequencies corresponding to each broadcasting source, a central management and processing unit capable of carrying out the real-time digitization of the information elements received by the receivers and of recording them cyclically and continuously with temporal reference markers corresponding to broadcasting time slots;

and of determining the time slot of the recording in which any information element, already broadcast, is located;

means for the reception of the telephone calls and for the transmission, on the telephone, of the information elements requested, B) Subscribers' equipment comprising telecommunications terminals that can be used for the interactive interrogation of the recording center and for the reception, on the telephone during the call itself, of the desired information elements through the switched telephone network.

The center may receive the information elements broadcast by the RF sources directly by means of RF waves. Naturally, should a source be located outside the reception perimeter of the center, a receiver is placed in the field of radiation of the source and is connected to the center by appropriate transmission means.

Figure 2:
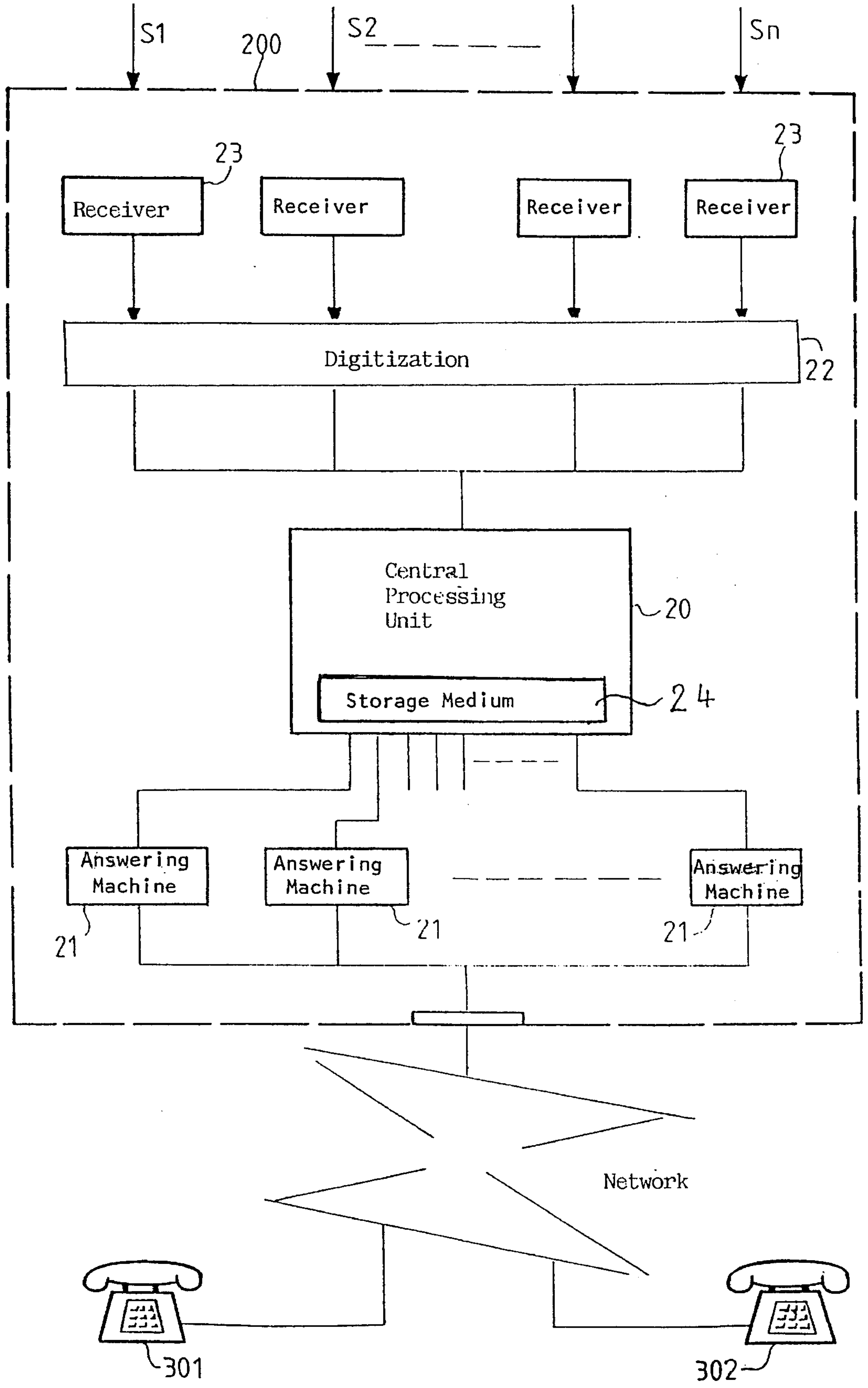

Other particular features and advantages of the invention shall appear from the description, which is given by way of an illustration but in no way restricts the scope of the invention, with reference to the drawings wherein:

FIG. 1 gives a schematic view of a system of access according to the invention;

FIG. 2 shows a more detailed diagram of the system as shown in FIG. 1.

The radio broadcasting sources that could be made accessible in deferred mode are brought together in the assembly referenced 100 in this FIG. 1.

Each source sends out broadcast information elements that can be picked up and listened to by means of radio receivers.

According to the invention, an access management and recording reception center 200 is designed to pick up the transmissions broadcast by all these sources, record them and retransmit them on the telephone to subscribers, upon calls from these subscribers, in doing so through the switched telephone network.

To this end, this management and recording center 200 has a set of radio receivers referenced 201, digitization and memorizing means 202 used to make recordings and a telephone line interface unit 203.

Each radio receiver is tuned to a broadcasting frequency of a given source and is connected to the recording means 202 so as to achieve the real-time recording of the broadcast transmissions. These information elements are recorded continuously and cyclically over a given period, for example 24 hours. More precise details on the recording shall be given here below in the description.

The center is fitted out for the direct reception, by RF waves, of the broadcast information (as indicated by arrows in this figure). In the case of a remote source, located outside the reception perimeter of the center, a receiver 150 is placed in the field of radiation of the source and is connected to the center by appropriate transmission means 170 such as, for example, a digital link which may or may not be specialized.

Furthermore, the center is equipped with a telephone line interface unit that is standard per se, enabling the reception of all the telephone calls received by the recording and management center so that these calls are answered and so as to enable the retransmission of each information element requested in each of these calls.

This figure also shows the subscribers' equipment enabling the interrogation of the recording center in the form of a block bearing the reference 300.

This equipment is constituted by telecommunications terminals that may be limited, for example, to simple voice frequency telephone sets.

FIG. 2 shows a more detailed view of an exemplary embodiment of an access system according to the invention.

A receiver 23 is provided for each broadcasting source S1, S2, Sn. The output of each receiver 23 is connected to a digitization circuit 22. This circuit 22 is formed by a set of standard analog-digital converters. The digitized information elements are transmitted to a central processing unit 20 which stores them in a storage medium 24. This unit is formed by means of a computer and its storage peripherals into which there will have been loaded an application program implementing the method described. The computer can notably be configured as an information retrieval center. To implement the method, it is possible, for example, to use a computer that works with the UNIX operating system.

The digitized and broadcast information elements may be stored in the hard disk of this computer or else on a digital optical disk, or on any other equivalent storage device that enables storage and reading without any delay.

The central processing unit furthermore receives all the calls that may be sent out from the telephone sets 301, 302 etc. at voice frequencies available to the subscribers.

The calls are received by devices such as voice frequency answering machines capable of:

converting the requests made by the subscriber on the voice frequency keypad into digital signals intended for the central processing unit;

expressing, in vocal form, the different answers given by the central processing unit, namely the messages and recorded information elements requested on the telephone during the call.

The central processing unit 20 makes it possible, upon reception of the requested broadcasting time and, possibly of the source (in the event of several sources), to seek the corresponding information element in the recording.

The central processing unit 20 is capable of responding to all the requests sent out by the answering machines and of transmitting the requisite information to them so that each answering machine sends the requested broadcast information elements, in voice form, to the subscribers who are hooked up.

A subscriber who seeks to obtain access, at a time of his choice, to any information element that has been broadcast, will proceed as follows:

using a voice frequency telephone set, or an equivalent telecommunications terminal, he will use the keypad of this set to enter the number of the management and recording center. When the call is put through, he receives a voice message from this center asking him to give the time of broadcast and, if necessary, the broadcasting source of the information that he wishes to listen to. The subscriber will either give these particulars orally or enter a code that will correspond to the exact hour and the exact minute when the information that he wishes to hear is broadcast. If he wishes to listen to information that is broadcast at 07.55 hours, he will enter, for example, 0755 or quite simply 3, where 3 corresponds to the code given to a news bulletin at 07.55 hours.

Should the subscriber give the information elements orally instead of entering them by means of the keypad, the answering machine 21 is designed so that, in this case, it is capable of interpreting the subscriber's vocal commands similarly to voice frequency codes.

Should it be planned that several stations will be reached through one and the same call number, the subscriber will have transmitted the name of the broadcasting station beforehand, for example by entering a number assigned to this source S1. (for example No. 1 for the source S1).

As has been stated with respect to the broadcasting time, the name of the source may be given orally by the subscriber instead of being entered through the keypad, the answering machine 21 being then designed so that, in this case, it is capable of interpreting the subscriber's voice commands similarly to voice frequency codes.

In accordance with the invention, there is also provision for dedicating keys of the keypad of the telecommunications terminal to predetermined functions. These functions are, for example, the "forward run", "back run" "pause" and "restart" functions. To this end, the central processing unit 20 is capable of recognizing the pulses sent out from these keys, by way of functions, when these pulses are received after the call number has been entered while the central processing unit controls the dialog with the subscriber or during the reading of a recording. Thus, during a call, the subscriber can either go backwards or go forward or obtain a pause by pressing the dedicated keys.

In the same way, the central processing unit 20 is then capable of recognizing the pulses sent by means of dedicated keys when they are received after the number has been called and after the corresponding telephone connection, namely during the dialog between the subscriber and the answering machine of the center. Provision may be made, for example, for a function key defining a code for the selection of a particular information element (for example: the key "1" makes it possible to obtain the days last newsflash).

A detailed description shall now be given of a preferred way to make the recording.

To simplify the explanation, the term "information retrieval center" shall hereinafter be used to designate the access management and recording center referenced 200 in FIGS. 1 and 2.

According to the invention, the broadcast information elements are digitized as and when they are received (in real time) and recorded continuously. Thus recording takes the form of a continuum whose duration, in principle, is limited only by the characteristics of the systems and media used for the storage of information in the information retrieval center.

To this end:

i) the information retrieval center will record all the information coming from a radio broadcasting source on only one message (a continuum) solely within the limit of the maximum duration of this continuum (several hours).

ii) the information retrieval center is capable of managing access in reading mode so as to retransmit all or a part of this continuum or message. It starts the reading from any position whatsoever in the continuum determined, for example, by the number of seconds measured since the start of the continuum, i.e. at To (To: time at which the recording starts) +N seconds (N : any number of seconds in the duration of the continuum recorded).

iii) The information retrieval center is capable of meeting any request for a block of information coming from the subscriber, by making a precise computation of the To+N corresponding to this request (for example To+N−15s, in response to the backward run command).

The lag between the requested time and the time of actual listening remains imperceptible to the subscriber: it is for example in the range of 300 ms.

Recording by continuum gives the following advantages:

the least possible number of gaps in the recording;

the smallest possible number of silences in listening to the information;

In the detailed description that shall be given of a continuum-based recording, it has been sought to resolve the following problems:

a) Giving the greatest possible length to each continuum while at the same time protecting the system against losses of information induced by possible malfunctioning of the information retrieval center (which should remain as rare as possible in any case).

b) The information retrieval center is not necessarily capable of recording very lengthy continuums (for example continuums that are longer than about 16 hours). For a given period (for example of 24 hours), the recording therefore necessitates several continuums.

c) When the information retrieval center initializes an new recording on the continuum (for example on 2nd June 11.00 hours), it is not necessarily capable of preserving reading access to information elements recorded previously (for example on 1st June at 11.00 hours) on this continuum. To enable the subscribers to read these prior information elements, it must be seen to it that the new recording will always start on a continuum that will not be called upon at the same time for the reading of the prior information elements.

d) Preventing any "gaps" in the recording. To this end, it has been chosen to bring about an overlappiing in time of two successive continuums (for example, a radio transmission is recorded on one continuum up to 02.00 hours and the next one starts at 01.30 hours, two recordings being thus available in parallel for the overlapping period of 01.30 hours to 02.00 hours).

e) Complying with the normal operating cycle of the service (for example, the daily cycle for the service of access to broadcast information elements).

f) while taking account of a) here above, optimizing the storage of information, thus preventing an excessively long overlapping between two successive continuums.

To this end, the recording could be done as follows:

1) The cycle chosen for the recording is the daily cycle.

2) Four continuums are used to record one and the same source of broadcast information elements. Each of them can be used to record eight and a half hours of broadcast information elements.

3) The recording time slots are, for example, respectively:

| | |
|---|---|
| .00 hours to .30 hours: slot No. 1 | P=1 |
| .00 hours to .30 hours: slot No. 2 | P=2 |
| .00 hours to .00 hours: slot No. 3 | P=3 |

the exact times at which each of these continuums start and end being adjustable in keeping with the elements indicated here above, as a function of the following factors: the maximum listening time permitted (for example: 20 minutes on the Audiotel kiosk presently set up in France), prime listening times on each recorded radio station, busiest times on the information retrieval center and the necessary overlapping to ensure the greatest relialibility of access to the recorded information.

4) To ensure a simultaneous recording of one and the same information element during the overlapping slots between two consecutive continuums, the information input channels on the information retrieval center may, for example, be twinned notably on the card providing for the simultaneous recording of these sources of information. When the recording is activated on both of the channels that are thus twinned, the information recorded through these two channels is the same at any common recording instant.

5) To ensure the availability, in reading mode, of the last 24 hours of broadcast information elements, the recording is done permanently on the fourth continuum, i.e. on the continuum that does not correspond to the last 24 hours recorded. Thus, the duration of the recording made is greater than the duration of the radio broadcast transmissions available.

To determine the continuum to be used in recording, provision is made, for example, to compute an order number C for this continuum, for example between 0 and 3 on the basis of the day of the month Q (which is not reset at 1 on 1st January) and of the No. P of the recording slot, according to the following formula:

$$C=[Q\times 3+P] \text{ Modulo } 4$$

When the subscriber wishes to listen to information relating to the time H, the information retrieval center determines the continuum on which the information must be read on the basis of the current day of the month Qc and the current time Hc, i.e. the date and the time corresponding to the instant at which his request is made. To do this, he proceeds as follows:

He determines the day of the month corresponding to the requested time Qd on the basis of Qc and Hc: Qd =Qc if the number corresponding to the requested time is smaller than the number corresponding to the current time Hc (for the information requested dates from the same day); if not, Qd=Qc−1 (for the information requested dates from the previous day); the day of the month, having been initialized in the information retrieval center, has a value that is strictly greater than 1.

Then, on the basis of Qd and the requested time, he determines the value (Qe) of the day of the month prevailing when the recording of the desired continuum had started: Qe=Qd−1 if the number corresponding to the requested time is smaller than 3 (for, in this case, the recording of the continuum to be used had started on the previous day at 19.00 hours); if not Qe =Qd (for, in this case, the recording had begun on the same day as the one corresponding to the requested time).

Finally he computes the order number C of the continuum to be used in reading mode according to the formula:

$$C=[Q\times 3+P] \text{ Modulo } 4$$

where P is the number of the requested time slot.

The subscriber may ask to listen to a radio broadcast information element that is close to the end of a message (continuum).

The overlapping provided for in the recording makes it possible to prevent the silences that then appear in a standard embodiment and that are due to the passing of the information retrieval center from one message to another.

Indeed, when the choice of time requested by the subscriber is close to the passage from one continuum to the next one, the overlapping of these two continuums gives the information retrieval center the choice of meeting the subscriber's request. It chooses the "youngest" continuum (namely the continuum whose starting time is prior to and is the closest to the time requested by the subscriber). In the example described here above, the method used to determine C leads the information retrieval center to choose the youngest continuum.

Thus, the subscriber is sure of being able to listen to the radio broadcast information without any silences. No passage from one continuum to the next one is is needed in order to meet his requirements for as long as he wishes (taking account of the time limit which, as it happens, is fixed by the Audiotel kiosk).

Since the information retrieval center enables the retransmission of a continuum without waiting for the recording on this continuum to be completed, i.e. at the end of the period planned for the continuum, the interval between the point in time when the information element is recorded in the information retrieval center and the point in time when it can be listened to by the subscriber is limited to the time of processing by the information retrieval center, for example 300 ms.

The service for listening to the broadcast during transmission itself is then available with, however, a small time lag (for example of the order of 300 ms) between transmission from the radio station and retransmission by the information retrieval center to the subscriber.

Furthermore, in a practical embodiment, there may be a significant lag between the time of transmission of the radio broadcast information (for example, the chimes announcing the time on a radio broadcasting source) and the time of recording by the information retrieval center, i.e. the time at which the information retrieval center notes that this broadcast information element has been recorded.

The consequence of such a lag is that, when the subscriber asks for a broadcast information element starting from a given time, he may receive, from the information retrieval center, information that has been transmitted at a different time (for example, he may ask to listen to the radio from 07.55 hours onwards but may hear chimes signifying 08.00 hours on the radio, which indicates a time lag of five minutes).

To prevent such a time lag, it is indispensable that the information retrieval center (at least in its function of recording of the broadcast information elements) should always know the time at which these information elements are transmitted.

To do this, the information retrieval center may be kept, for example, at the exact time so that there is permanent knowledge of the time corresponding to the broadcast information elements that it receives and records.

To keep the information retrieval center at the exact time, the procedure used will preferably be the one that shall be indicated.

To this end, it is necessary to equip the information retrieval center with a device enabling it have automatic and permanent knowledge of the exact time, this device being set up, for example, by listening to the clock of a reference broadcasting source (such as the radio station France Inter).

In order that the synchronization of the recording function of the information retrieval center is not done with excessively big jumps that would be perceptible to the subscriber, there is provision for a regular resetting of the information retrieval center to the exact time.

The time-resetting operations are therefore done periodically, as a function of the detected lag in relation to the exact reference time.

In the case of a information retrieval center connected to an integrated services digital network or ISDN (such as the Numeris network), the information elements given by the PCM (pulse code modulation) clock signal of the Numeris network (coming from the France Telecom network) may contribute to limiting time lags.

To prevent the disturbances associated with time changes (for example the change from winter time to summer time in France) the recording is systematically set exactly to Greenwich Mean Time.

In answering a subscriber's request, it is important that the information element transmitted should be exactly the one requested.

To do this, apart from keeping the information retrieval center at the exact time for the recording of the broadcast information, the time chosen by the subscriber is applied by the information retrieval center with precision as regards the exact point of time at which the listening should start on the continuum corresponding to the broadcast information requested, this point of time being in the form To+N (where N is equal to the number of seconds from the start of the continuum).

In the computation of this To+N, the information retrieval center must:

a) have precise knowledge of the time at which each continuum (To) starts; to do this, the times at which the recordings of the continuums start are systematically planned in anticipation, the information retrieval center being synchronized with the exact time; the information retrieval center guarantees that the recording actually starts at the precise time at which it has been requested, except for the processing lag which for example is of the order of 300 ms;

b) have knowledge of the time at which the listening to the continuum has been interrupted by a command from the subscriber, notably when the subscriber wishes to return backward, go foward or make a pause; to do this, the information retrieval center, in order to compute N, notes the exact time at which the subscriber's commands are transmitted to it.

c) take account, for the computation of N, of any time lag that is set up between the current time of the recorded radio broadcasting source and the time noted for the recording (GMT), this information being given to it, in principle, for each of the recorded radio broadcasting sources as a function of the standard time in the country of transmission.

Since the information retrieval center knows the exact time, it can furthermore register the information elements that are needed for the proper use of the service, notably in a logbook of the communications made by the information retrieval center.

As has been stated further above, the information retrieval center is capable of simultaneously recording several sources of information, for example radio sources from currently used broadcasting means, broadcasting on usual frequencies by means of a tuner, for example, broadcasting by satellite etc.

In order that the corresponding information elements may be accessible to the subscriber in one and the same telephone call to the information retrieval center, the continuums used to record several information sources are available on one and the same subscriber access line.

The information element are also accessible as soon as they are recorded (for listening during the broadcast itself).

To this end, the information retrieval center has several access lines for the recording.

For a recording of radio broadcast information, these access lines enable the information retrieval center to record radio broadcast transmissions by means of a tuner or a piece of equipment for the reception of satellite transmissions.

This can be done, for example, by the installation, in the information retrieval center, of a multiple recording card, of the tape-recorder or tuner type, provided with analog connections, enabling the simultaneous recording of information elements of the type mentioned here above.

The system can also be arranged so that the information retrieval center is able to make recordings from an information source that makes its transmissions through a standard telecommunications network (for example, by means of a dedicated link, a switched telephone network, a Numeris type of ISDN network, etc.).

The information retransmitted to the subscriber may undergo deterioration. In the event of radio broadcast information, this may be due for example to:

electromagnetic disturbances related to the presence of items of equipment in the vicinity of the antenna, starting with the information retrieval center itself;

an error in the setting of the reception frequency of a tuner; it should be possible to tune the tuner simply and precisely to the transmission frequency and to keep the right setting;

an accidental defect in the assembly of the recording equipment.

To prevent deterioration such as this, several steps are taken, notably in the case of reception by means of tuners:

a) the antenna is placed at a distance from the information retrieval center or other items of computer equipment;

b) a standard tuner with automatic tuning to the transmission frequency of the radio broadcasting source is implemented;

c) the recording device is provided, in the information retrieval center, with a known mechanism for the systematic detection of noises or blanks in the transmission of information.

d) the recording device in the information retrieval center is provided with a known mechanism for the systematic detection of a signal from the transmitter of information elements when this has been arranged in advance.

I claim:

1. A method of deferred access to radio information elements broadcast by a radio broadcasting source, the method comprising the steps of:

receiving and digitizing the information elements broadcast by the source;

recording the information elements cyclically and continuously with temporal reference markers corresponding to broadcasting time slots;

determining the time slot of the recording in which any information element is located;

accessing the recorded information elements from a telecommunications terminal through a switched telephone network, the accessing step including establishing a telephone call from the telecommunications terminal to the central processing unit by dialing a telephone number assigned to a central processing unit, giving the source and time of the broadcast or a corresponding code of the information elements, dedicating keys of a keypad of the telecommunications terminal to predetermined functions, and interactively interrogating the central processing unit by pressing one of the dedicated keys, the telecommunications terminal transmitting requests corresponding to the predetermined functions in response to the pressing of the dedicated key;

reading and transmitting the information elements, the information elements being transmitted to the telecommunications terminal through the switched telephone network during the telephone call;

interrupting the reading and transmitting of the information elements when a request is received from the telecommunications terminal;

responding to the request during the interrupting step; and receiving the information elements instantaneously on the telecommunications terminal.

2. The method of deferred access to radio broadcast information elements according to claim 1, wherein the predetermined functions are the functions of backward running, forward running and pausing with respect to a read information element.

3. The method according to claim 1, wherein the broadcasting source and time are given from the keypad of the telecommunications terminal.

4. The method according to claim 1, wherein the telecommunications terminal comprises a telephone and wherein the broadcasting source and time are given orally through the telephone.

5. The method according to claim 1, wherein the reading and transmitting step occur in real-time relative to the recording step.

6. A system of deferred access to radio broadcast information elements broadcast by a radio broadcasting source, the system comprising:

a center for receiving and recording broadcast information elements and for managing access to the information elements in read/write mode, the center being accessible through a switched telephone network, and the center including:

a radio broadcast receiver, the receiver being tuned to a broadcasting frequency corresponding to the broadcasting source, a central management and processing unit, the central unit digitizing in real-time the information elements received by the receiver, and the central unit recording the information elements cyclically and continuously with temporal reference markers corresponding to broadcasting time slots, the central unit determining the time slot of the recording in which any information element is located, and the central unit recognizing and responding to interactive requests as the interactive requests are received;

means for receiving a telephone call through the switched telephone network and for transmitting during the telephone call the information elements requested; and subscribers' equipment including a telecommunications terminal for interactively interrogating the central unit by transmitting interactive requests to the central unit, and for receiving the desired information elements through the switched telephone network during the telephone call.

7. The system of access according to claim 6, wherein the means for receiving and for transmitting comprises an answering machine, and wherein the answering machine sends pre-recorded voice messages and restores the requested information elements also in the form of voice messages.

8. The system of access according to claim 6, wherein the telephone terminal comprises a telephone having a voice frequency keypad.

9. The system of access according to claim 8, wherein the keypad comprises keys dedicated to predetermined functions.

10. The system of access according to claim 6, wherein the source is located outside the reception perimeter of the center and wherein the receiver is placed in the field of radiation of the source and is connected by transmission means to the center.

11. A system for accessing radio broadcast information elements from a broadcast source, the system comprising:

a center, the center including a radio broadcast receiver, the receiver being tuned to a frequency corresponding to the frequency of the broadcast source, a central processing unit, the central unit defining means for digitizing in real-time the information elements received by the receiver, for recording the information elements cyclically and continuously with temporal reference markers corresponding to broadcasting time slots, for determining the time slot of the recording in which any information element is located, for reading the information elements requested through the switched telephone network, for interrupting the reading of the information elements when an interactive request is received, for responding to the requests during the interruption; and a telephone interface unit, the telephone interface unit defining means for receiving a telephone call through a switched telephone network, and for transmitting the information elements through the switched telephone network during the telephone call; and a telecommunications terminal, the telecommunications terminal defining means for transmitting the interactive requests to the central unit, and for receiving the desired information elements through the switched telephone network during the telephone call.

12. The system according to claim 11, wherein the telecommunications terminal comprises a telephone having a voice frequency keypad.

13. The system according to claim 12, wherein the telephone interface unit further comprises means for converting requests made by subscribers on the voice frequency keypad into digital signals, and for expressing vocally an answer given by the central unit to the request.

14. The system according to claim 11, wherein the keypad comprises keys dedicated to predetermined functions.

15. The system of access according to claim 11, wherein the source is located outside the reception perimeter of the center, and wherein the receiver is placed in the field of radiation of the source and is connected by a transmitter to the center.

16. The system of access according to claim 15, wherein the transmitter comprises a digital link.

17. A method for the real-time access to radio information elements broadcast by a radio broadcasting source, the method comprising the steps of:

receiving and digitizing the information elements broadcast by the source;

recording the information elements cyclically and continuously with temporal reference markers corresponding to broadcasting time slots;

determining the time slot of the recording in which any information element is located;

accessing the recorded information elements from a telecommunications terminal through a switched telephone network, the accessing step including establishing a telephone from the telecommunications terminal to the central processing unit call by dialing a telephone number assigned to a central processing unit, and giving the source and time of the broadcast or a corresponding code of the information elements;

reading the recorded information elements and transmitting the information elements to the telecommunications terminal through the switched telephone network during the telephone call, the reading and transmitting step occurring in real-time relative to the recording step; and receiving the information elements instantaneously on the telecommunications terminal.

* * * * *